United States Patent Office 3,395,299
Patented July 30, 1968

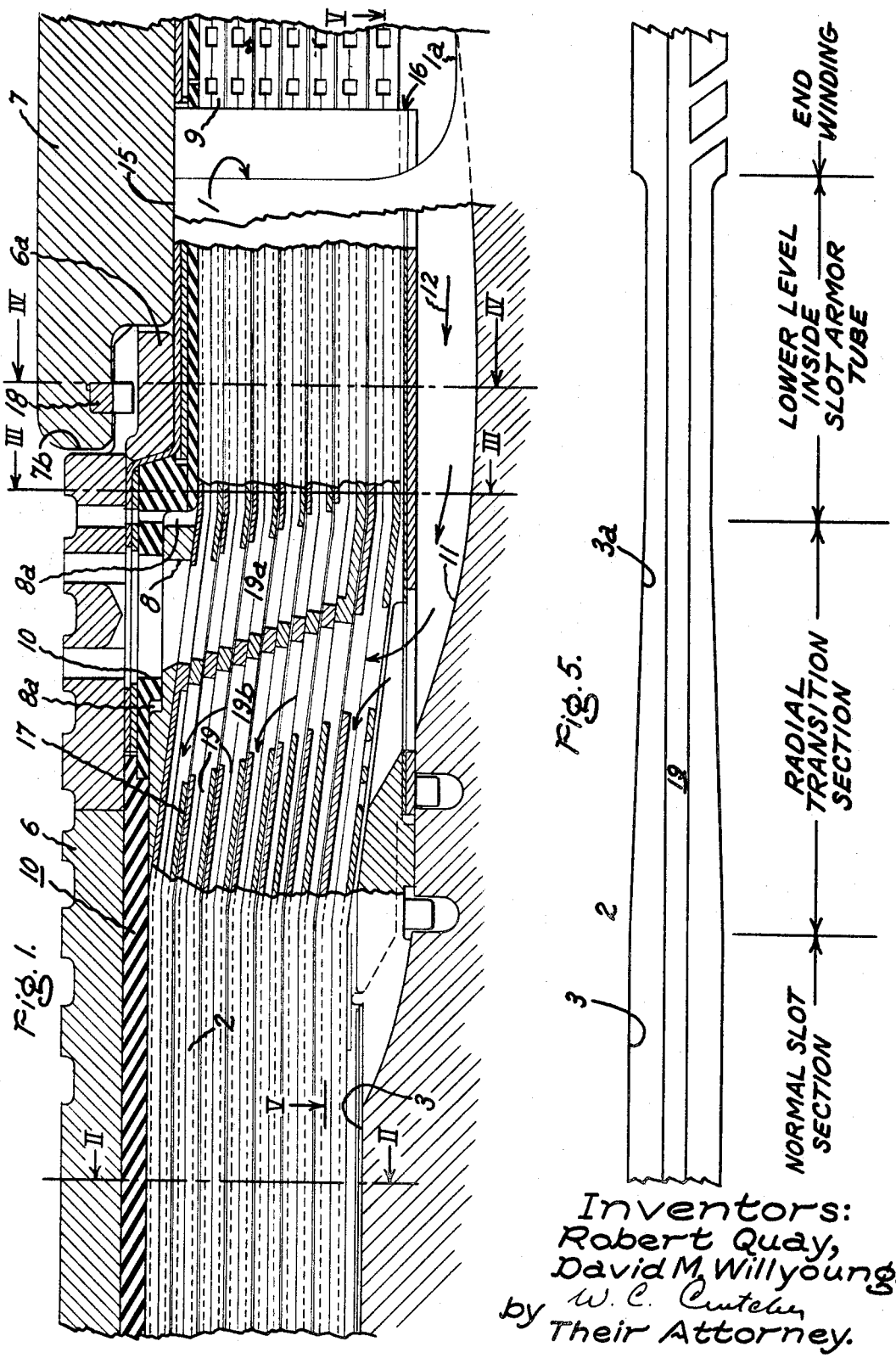

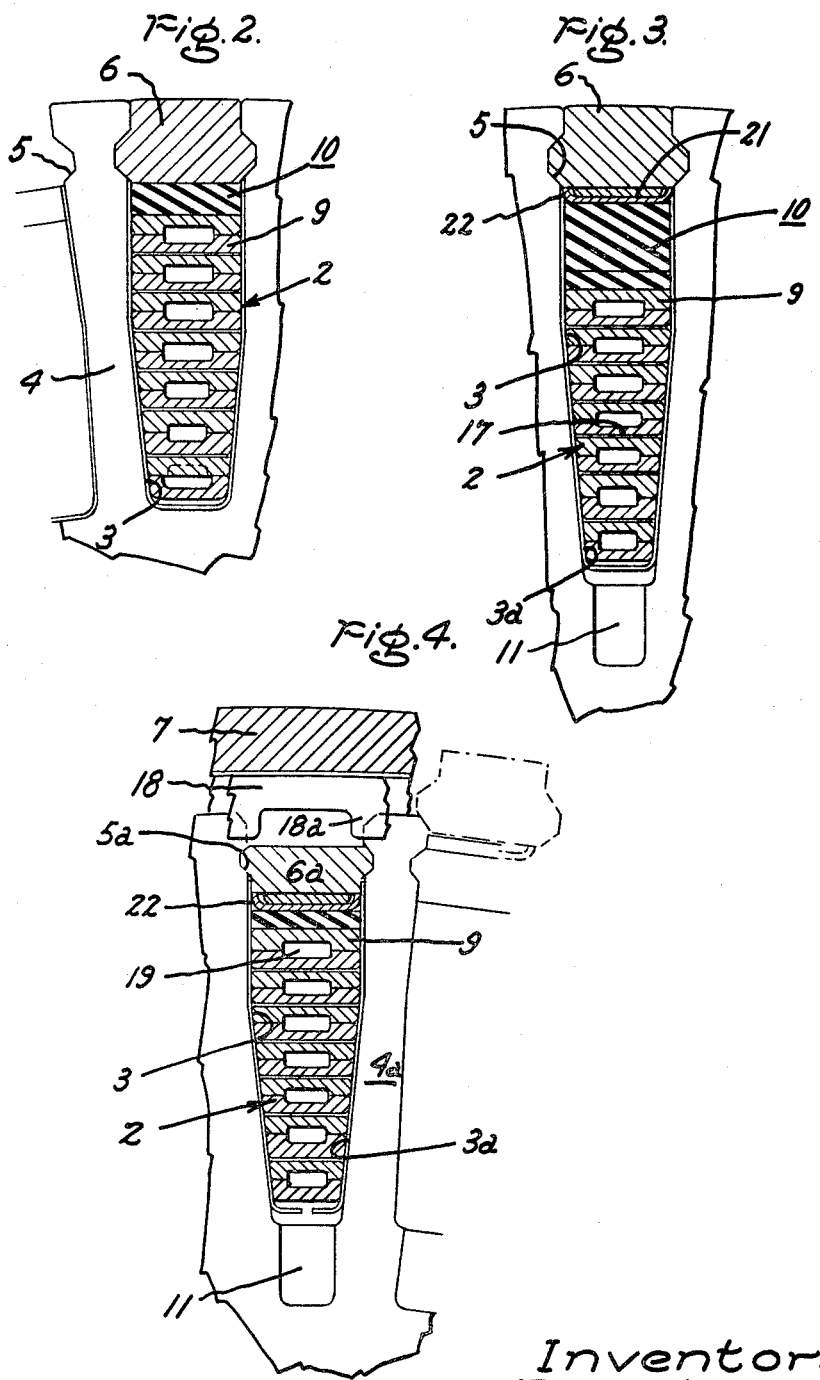

3,395,299
DOWNSET END WINDING ROTOR FOR
DYNAMOELECTRIC MACHINE
Robert Quay, Schenectady, and David M. Willyoung, Scotia, N.Y., assignors to General Electric Company, a corporation of New York
Filed Sept. 16, 1965, Ser. No. 487,704
9 Claims. (Cl. 310—261)

ABSTRACT OF THE DISCLOSURE

A dynamoelectric machine rotor which has a body of modified cylindrical configuration containing axially extending teeth defining axially extending radial slots. The center portion of the rotor has a greater diameter than the end portions with an area of even transition between the center and end portions. Retaining rings are tightly fit around the teeth at each end of the rotor for securing the windings.

---

This invention relates to an improved rotor construction for dynamoelectric machines of very large rating. More particularly it relates to an improved arrangement for the windings and their supporting structure at the ends of a dynamoelectric machine rotor, as, for example, a turbine-generator rotor, which permits said rotor to be built larger in diameter and hence larger in capacity than has heretofore been possible for the same allowable stress limits in the limiting parts.

The continuing trend in the power generation industry is toward generators of increased capacity. This has been done by utilizing higher current loadings, accompanied by improved cooling of the current-carrying parts, as well as by increased physical size of the electromagnetic structure. It is known that both the cooling capability and the physical size must increase more or less in proportion if the generator efficiency is to be maintained as the rating is increased. However, there are many obstacles which limit the physical dimensions of the generator, including considerations of transportation and the available strength of materials for the rotating parts. Foremost in the latter category is the material for the retaining rings, which are by far the most highly stressed parts.

Typically, the retaining rings consist of massive cylinders of nonmagnetic steel which are tightly fit over the ends of the generator rotor to support the centrifugal load of the rotor windings at their end portions where they are not locked in place by wedges in the rotor slots. The radially outward centrifugal force of the coils, insulation, supporting blocking, amortisseur winding and miscellaneous locking keys acting on a retaining ring may amount to 8 to 10 million pounds in a typical 3600 r.p.m., 2-pole rotor and, of course, will be even greater if the rotor is overspeeded. This is only ⅓ to ¼ of the total load on the retaining ring, however, the remainder arising from the centrifugal force of the retaining ring itself. This major part of the total ring stress increases as the square of the mean diameter of the retaining ring, while the active "payload" increases in a more complex way if the rotor diameter is increased, depending on the mean radius of the coil ends, blocks, etc., and their weight. At present, with available materials, the rotor diameter for 2-pole, 3600 r.p.m. generators is limited by the retaining ring stress to approximately 40″, or slightly higher if the rotor is purposely designed with a reduced amount of copper in the windings.

Except for the retaining ring stress problem, larger diameter rotors could be designed either by utilizing stronger materials which are presently available for the solid rotor body forging, or by reproportioning the rotor coil slots and the rotor teeth, making the slots shallower relatively and the teeth wider relatively, to provide more relative area to carry the higher centrifugal load. (In practice such larger diameter rotors will probably utilize both somewhat stronger steel for the rotor forging and some reproportioning of the cross section to increase the relative areas of the load-carrying parts.)

Generator capability can be increased rather rapidly if larger diameter rotors can be used, first, because the magnetic flux-carrying areas of the shaft per inch of length increase; second, because the shaft itself can be made longer without encountering balance problems resulting from excessive shaft flexibility or low critical speed; thirdly, because with a diagonal-flow gap-pickup rotor, such as described in U.S. Patent No. 2,986,664, issued to D. M. Willyoung and P. A. Becker, and assigned to the assignee of the present invention, the cooling effectiveness is increased by the higher rotor peripheral velocity; and fourthly, because despite the fact that the relative amount of copper in the rotor cross-section will be reduced, the total area of copper in the winding can be increased somewhat since the shaft cross-section area is larger.

Efficiency is another very important characteristic for large generators. Improved cooling methods have allowed ratings to be increased by increasing the currents in the windings. However, since the current-induced losses increase as a power of the current, usually about as the square, while the output increases only as the first power, it has been necessary to use all the best loss-reducing techniques and design refinements to maintain the generator efficiency level for very large units. Rotor copper losses are generally the largest single item of loss in a generator so that it is important to utilize tapered rotor slot designs in order to make optimum use of the available rotor cross-sectional area to keep the rotor copper losses as low as possible. In addition, it is important to proportion the rotor-winding slots and the flux-carrying areas of the shaft in such a way that an optimum balance is obtained between generator capability and the rotor copper losses.

Since ⅔ to ¾ of the total retaining ring stress is due to the mass of the ring itself, it is apparent that the rotor body diameter can be increased very little by reducing the weight of the conductors in the rotor end windings, and to do so would impose a severe burden on the generator efficiency and the rotor end winding cooling requirement. Moreover, if this reduced conductor area is utilized over the full slot length, a further penalty on the generator capability that can be obtained is imposed since the optimum balance of rotor cross-sectional proportions cannot be used. This invention attacks the problem in a more satisfactory way by utilizing a rotor with an increased body diameter over most of its length, with a smaller diameter at its ends, the conductors being formed with a downset into the rotor body at the ends so that the retaining ring diameter and retaining ring stresses are not correspondingly increased.

Generator rotors with downset end windings have long been known and were utilized extensively in the early decades of the century when generator air gaps were too short to permit the retaining ring to pass through the stator core unless this were done. An example of such a rotor is shown in FIGURE J of the 1918 discussion by J. A. Kuyser found on page 508, volume 56, of the Journal of the Institution of Electrical Engineers. However, the downset in these rotors was located outside the rotor slot, the retaining ring thickness at one end had to be reduced, reducing its load-carrying ability, and the features incorporated in this invention as enumerated in the following paragraphs were not employed.

Accordingly, it is an object of this invention to provide a generator with an increased rotor diameter without a corresponding increase in the diameter of its retaining rings.

Another object is to accomplish this in such a way that the optimum proportioning of the rotor body cross section and tapered rotor slot shape is in no way compromised because of this feature and the stresses in the rotor forging are not raised relative to what they would be if it were possible to build the rotor with a normally arranged retaining ring of higher strength.

Another object is to provide a design which accommodates the axial thermal expansion of the rotor coils in a downset end winding construction without undue stress on the insulation.

Another object is to provide a rotor design with downset retaining rings and rotor end windings in which the retaining ring thickness and hence its load carrying ability, remains essentially constant along its length, and in which the retaining ring can be locked on to the end of the rotor body in a safe, straight-forward manner similar to that disclosed in U.S. Patent No. 2,960,360 issued to H. D. Taylor, and assigned to the assignee of this application.

Other objects, advantages and features will become apparent from the following description when considered in connection with the accompanying drawings wherein:

FIG. 1 is a longitudinal sectional view of an end portion of a generator rotor according to this invention.

FIG. 2 is a cross section of a rotor conductor or coil, taken along the line II—II of FIG. 1.

FIG. 3 is a cross section of a downset end portion of the same rotor conductor or coil taken along the line III—III of FIG. 1.

FIG. 4 is a cross section of a downset end portion of the same rotor conductor or coil taken at line IV—IV of FIG. 1.

FIG. 5 is a plan view of a typical conductor section showing the variation in which corresponding to the elevation view of FIG. 1, and taken along line V—V of FIG. 1.

Briefly stated, in accordance with one of its aspects, this invention comprises a generator rotor of increased diameter whose windings are downset near the end of the rotor body in the rotor slots to fit inside a retaining ring which is "standard" and not of a similarly increased diameter.

More particularly, and referring now to the drawing, the generator rotor comprises a body portion 1 with integral shaft end portions or spindles 1a, at either end.

Only the end portion of generator rotor 1 is shown, carrying conductors generally shown at 2 within and along axially extending slots 3 formed by rotor teeth 4. Formed in rotor teeth 4 are axial keyways 5 (FIG. 2) which accommodate keys or wedges 6 longitudinally of the rotor body and which serve to hold conductors 2 within slots 3 when the rotor 1 is spinning.

Outside the end of the rotor body 1 the rotor coils 2 are restrained from outward radial movement by a massive cylinder or retaining ring 7 which is tightly shrunk-on to the end of the rotor body 1 over the cylindrical surface 15.

Rotor coil slots 3 are cut along the entire length of the rotor body. Close to the end of the rotor body the coil winding slot space 3 is deepened by machining out additional material from the bottom of the coil slot 3 to produce winding slot contour 3a of reduced inside radius. That is, the minor diameter of the winding space 3 is made smaller near the rotor body ends than in the central portion. This provides space for the conductors 2 to make a transition in their radial position between their extended radial position in slot 3 over the central portion of the rotor and their reduced radial position around the end windings.

Slots 3 are generally of tapered cross section for large, high efficiency turbine-generators to utilize the available area most effectively. The slot taper in the central portion (see FIG. 2) is extended in the reduced radius end portions 3a (see FIG. 3 or 4) so that the width of the tooth is not reduced in its end portion 4a relative to its width in the center portion 4, and the tooth stresses in the end portion 4a are thereby maintained at or below their values for the central portion 4. In other words, the coil slots 3, being of tapered cross section, are reduced in width as they are depressed deeper into the rotor body in order to maintain the tooth width as just described.

FIGURE 5 shows a developed axial plan view of a conductor 2, being of reduced width over the end portion length which occupies the reduced radial position within the slot section 3a and for a short distance outside the end of the slot to the point where it clears the axially extending slot insulation tube 16 (FIG. 1). This conductor portion of reduced width is connected to the central conductor portion of normal width through an axially extending transition phase which occurs over the same conductor length where the transition in radial conductor position occurs along the rotor slot. The slight increase in heating due to increased ohmic loss over the short conductor length of reduced width in the transition and end portions is compensated for in the ventilation of the conductors in this area. The total ohmic loss of the entire winding is reduced relative to a normaly constructed rotor without downset coils despite the higher loss in this short end portion at the ends of each slot, since the conductor radius is reduced in the end turn portion under the retaining ring so that the length of the peripherally extending portions of the coils, not shown, is correspondingly reduced and a more than offsetting reduction in ohmic losses in the rotor end windings is obtained.

In the area where conductors 2 make the radial transition from their extended position in the central portion to their reduced radial position at the ends, they are firmly held in radial position and guided by tapered shims 8 which are brazed or otherwise fastened to the outermost conductors 9 of coils 2. Shims 8 are in sliding contact with the insulation creepage blocks 10 which are used between wedges 6 and coils 2 to precent electrical flashover. As shown in FIG. 1, creepage blocks 10 and shims 8 are stepped in the area where they co-act in order to reduce the parasitic weight of the shim and increase the length for electrical flashover in this region where apertures are provided in the insulation blocks 10 for ventilating gas discharge. Axial clearance 8a is provided between shims 8 and blocks 10 to allow for the thermal expansion of the conductors 2. Since the temperature rise of the conductors 2 in the slot is relatively uniform when the conductors are internally ventilated, they expand thermally nearly the same amount and this axial, thermally induced motion is taken up by relative motion between the shims 8 and the blocks 10 along a surface of constant radius. By this device, thermally induced pressure concentrations on the thin insulation strips 17 between conductors are avoided and axial forces, which might differ from slot to slot due to the variability in frictional characteristics and therefore disturb the running balance are also avoided. In other words, the coil can expand as a unit in the transition section, sliding along surfaces of constant radius at the outside of shim 8.

An important consideration in the design of a large generator rotor is a means to securely anchor and center the retaining ring 7 to the end of the rotor body 1, without weakening ring 7 in any way. By providing a large shrink fit interference between the two along fit surface 15, the retaining ring the coil ends which it supports can be adequately centered. Thermal expansion of the coils, acting through friction against the retaining ring, will produce axial forces on the retaining ring which may amount to 500,000 pounds or more. A satisfactory way to secure the retaining ring against these forces in a normally designed rotor is described in the aforementioned U.S. Patent No. 2,960,360, issued to H. D. Taylor. As seen in FIG. 1, a modification of this method is used in this invention wherein, because the retaining ring fit diameter 15 is deeply downset relative to the outer diameter of rotor body 1, a "lower level" coil slot wedge 6a, inserted in short keyways 5a (FIG. 4) formed in the ends of the rotor teeth 4, is used. This provides space in which peripherally extending locking key 18 (FIG. 1 and FIG. 4) with radially extending locking fingers 18a is rotated circumferentially after retaining ring 7 is shrunk in place in order to lock the retaining ring 7 in axial position against the axial thrust forces. (Axial extending fingers on locking key 18 in the pole region of the rotor as described in aforementioned Patent 2,960,360, but not shown in these drawings are utilized to manipulate locking kay 18 in this way.)

In the central portion of the rotor and extending axially to the inside end 7b of the retaining ring 7, the centrifugal load of the conductors 2 and other material in slot 3 is supported by the outer wedges 6 held on outer keyways 5 in the rotor teeth. In the short slot portion between the end of the retaining ring 7b and the shrink-fit 15, the centrifugal load of the material in the slot is carried on the lower level wedge 6a and the short keyways 5a in the teeth. In the slot portion under the retaining ring shrink-fit 15 and in the regions outside the end of rotor body 1, the centrifugal load of coils and insulation is carried by the retaining ring 7.

It is important to note that the rotor tooth width is substantially maintained in the downset and transition regions of rotor coil 2 within the slots, and that this downset region is relatively short axially. Extensive calculations have shown that by doing this the tooth stresses in the downset and transition regions are no greater than in the central region of the rotor body, allowing the slot contour in the central region to be proportioned in the optimum way to obtain the highest generator capability per inch of length consistent with high generator efficiency. Further, because the downset region is short, calculations of the tangential stresses in the shaft-forging material below the coil slots show that these tangential stresses are no higher in the end portions they are in the central portion despite the fact that the slots are machined deeper. This is because of the three dimensional way in which the centrifugal loads are carried by the tangential stresses in the material below the slots. Along the shaft end extensions or spindles 1a, the total centrifugal load is low being due only to the material in the spindles themselves. Along the shrink-fit region 15 it is somewhat higher because of the additional load imposed by the weight of the steel teeth and poles, (but none by the material within the slot which is carried on the retaining ring). Further inboard of the shrink-fit region the forging material below the slots carries the entire centrifugal load due to coils 2, teeth 4, poles (not shown), wedges 6, and due to its own mass. While the shaft area available to carry this centrifugal load is reduced in the region where the coil slots are deepened, calculations show that since the downset region is short, enough of the load is transferred axially to the more lightly loaded regions (calculated on a 2-dimensional basis) in the shrink-fit region and along the shaft end extensions 1a, so that the tangential stresses are no higher than if the downset ends were not used. Thus, the arrangement allows the rotor to be proportioned in its central regions with no restrictions imposed because of the downset coil and retaining rings.

This invention is particularly applicable to large generators with conductor-cooled windings. The central portions of the rotor, not shown, may be cooled by diagonal flow ventilation as described in the aforementioned U.S. Patent No. 2,986,664, issued D. M. Willyoung and P. A. Becker, or in some other manner. The end sections of the conductors may be cooled by axial passages as shown in FIG. 2 and FIG. 3, which make a transition with the diagonal flow cooling axially displaced from the region shown in FIG. 1. In the embodiment shown, longitudinal ventilation channels 19 in the conductors are used to ventilate the coil ends and a short portion of the end of the slot (see FIG. 4). This gas is discharged to the rotor surface through radial apertures 19a in the rotor conductors 2, aligned with exhaust ports in insulating creepage blocks 10 and coil wedges 6. Short ventilation sub-slots 11 are cut beneath the coil-occupied portions of the slots 3 so that coolant fluid such as hydrogen can circulate in the vicinity of arrows 12 through the sub-slots and through radial aperture slots 19b into communication with ventilation channels 19 in the conductors as indicated by the arrows. Radial aperture slots 19a and 19b through the conductors are aligned in staggered relation in order to keep ventilation sub-slot 11 as short as possible, in order to avoid higher tangential stress in the material below the slots in this region than elsewhere in the rotor because of the three dimensional load-sharing effect, as previously described.

In operation, the above described srtucture functions as follows. While the rotor is spinning, coolant fluid flows from the casing through the ventilation sub-slots 11 and into communication with the bare conductors to effect their cooling in the critical transition area. As the coils heat up to normal operating temperature or cool down when not running, the resulting expansion or contraction of the conductors is guided at constant radius by tapered shims 8 to maintain a smooth transition from the greater to the lesser diameter, avoiding pressure concentrations on the coils or their insulation. Furthermore, as the rotor is spinning, the retaining ring is not stressed as much as it would be if the end windings were not depressed but were kept at the same diameter as those in the rotor central portion. Rotor teeth 4 in the end region are not unduly stressed, since their normal width has been maintained in both the central rotor portion and in the depressed area. Tangential stresses in the material below the coil slots are not increased in the end region of the body relative to the center region, despite the deeper slots, since the downset region is so short that centrifugal load in this area is transferred to the more lightly stressed regions of the end spindles and under the shrink fit.

Thus it will be seen that a generator rotor construction has been provided which permits greater diameter thereof notwithstanding the limitations imposed by the retaining rings. This greater rotor diameter in turn permits greater generator capability. Furthermore, because of the greater diameter and strength of the rotor, its bending characteristics are improved.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:

1. A dynamoelectric machine rotor comprising a rotor body defining a plurality of circumferentially spaced slots extending axially of the rotor body from one end portion thereof through the central portion thereof to the other end portion thereof, said slots being separated by circumferentially spaced teeth, the inside and outside diameters of said slots being greater in said rotor central portion than in said end portions, a portion of even transition at each end of said central portion to said end portions, the width of said teeth in the central portion, transition portions, and end portions being substantially constant in axial direction, and a retaining ring tightly fit around said teeth at each end of said rotor.

2. A dynamoelectric machine rotor comprising a rotor body defining a plurality of circumferentially spaced axially extending slots of a first depth and separated by circumferentially spaced teeth, each of said slots containing a conductor coil longitudinally disposed therein, said slots extending to a second depth greater than said first depth in the rotor portions adjacent the ends of said slots, said coils held within said slots by wedge members between and keyed to said teeth, said slots being inwardly tapered so that the root sections of said teeth are not the smallest sections thereof, tapered shims disposed between said wedge members and said coils in the area of transition of said coils from said first to said second depth to force said coils radially inwardly in said transition area, and a retaining ring surrounding said conductor coils adjacent the ends of said axially extending slots.

3. A dynamoelectric machine rotor comprising a rotor body of modified cylindrical configuration containing axially extending radial teeth defining axially extending radial slots, said slots having a smaller minor diameter in the rotor end portions than in the rotor central portion, said teeth having a smaller major diameter in the rotor end portions than in the rotor central portion, said slots each containing a conductor bar, said bars extending beyond the ends of said slots for series connection, and a retaining means disposed around said rotor body at each end thereof to retain the end extensions of said bars.

4. A dynamoelectric machine rotor according to claim 3 in which said slots are inwardly tapered so that the root sections of said teeth are not the smallest sections thereof.

5. A dynamoelectric machine rotor comprising a rotor body of modified cylindrical configuration containing axially extending radial teeth defining axially extending radial slots, said slots being inwardly tapered so that the root sections of said teeth are not the smallest sections thereof, said slots having a smaller minor diameter in the rotor end portions than in the rotor central portions, and said teeth having a smaller major diameter in the rotor end portions than in the rotor central portion, conductor coils longitudinally disposed within said slots and modified in cross section in their end portions for accommodation in the corresponding portions of said slots, and a retaining means fit around said rotor body at each end thereof.

6. A dynamoelectric machine rotor comprising a rotor body of modified cylindrical configuration containing axially extending radial teeth defining axially extending radial slots, said teeth having a substantially constant root thickness therealong, said teeth having smaller outside and root diameters in the end portions of said rotor than in the central portion thereof, conductor coils longitudinally disposed in conforming relation within said slots, said coils retained within said slots by wedges keyed into said teeth radially adjacent said coils, and a means disposed around said rotor body at each end thereof to retain the end windings of said coils in the area of their series connections.

7. A dynamoelectric machine rotor comprising a rotor body portion of modified cylindrical configuration containing axially extending radial teeth defining axially extending radial slots therebetween and axially extending keyways therealong, said slots containing axially extending conductor bars, said keyways containing wedges to retain said bars within said slots, said teeth having smaller outside and root diameters in the rotor end portions than in the rotor central portion, and retaining rings tightly fit over the outside diameters of said teeth in their end portions.

8. A dynamoelectric machine rotor according to claim 7 in which said keyways are at substantially the same radial positions relative to the outside diameter of said teeth in the end portions and the central portion of said rotor.

9. A dynamoelectric machine rotor according to claim 7 further including shims between said wedges and said conductor bars in the area of transition from the larger to the smaller tooth root diameters, said shims being tapered to abut the radially outer surfaces of said conductor bars and the radially inner surfaces of said wedges.

References Cited
FOREIGN PATENTS
336,711 5/1921 Germany.
615,090 6/1935 Germany.

MILTON O. HIRSHFIELD, *Primary Examiner.*

R. W. TEMPLETON, *Assistant Examiner.*